A. F. BLECHSCHMIDT.
POULTRY HOUSE EQUIPMENT.
APPLICATION FILED JUNE 3, 1911.
1,029,844.
Patented June 18, 1912.
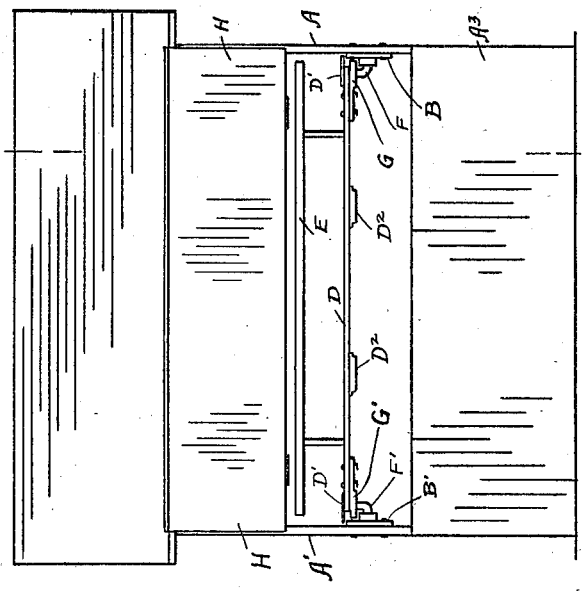
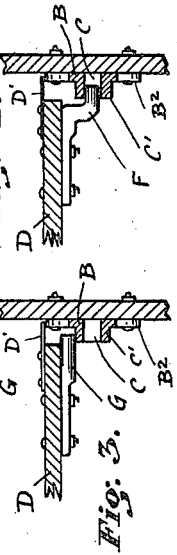
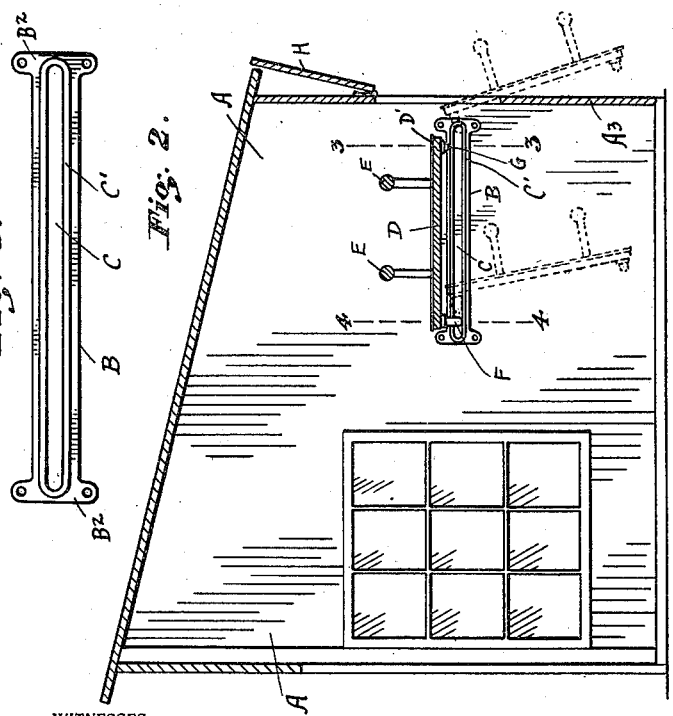
WITNESSES:
INVENTOR
ARTHUR F. BLECHSCHMIDT.
BY
ATTORNEY

UNITED STATES PATENT OFFICE.

ARTHUR F. BLECHSCHMIDT, OF CONNERSVILLE, INDIANA, ASSIGNOR OF ONE-HALF TO ADAM J. ROTH, OF CONNERSVILLE, INDIANA.

POULTRY-HOUSE EQUIPMENT.

1,029,844.

Specification of Letters Patent. Patented June 18, 1912.

Application filed June 3, 1911. Serial No. 630,994.

*To all whom it may concern:*

Be it known that I, ARTHUR F. BLECHSCHMIDT, a citizen of the United States, residing at Connersville, in the county of Fayette and State of Indiana, have invented certain new and useful Improvements in Poultry-House Equipment, of which the following is a specification.

This invention relates to improvements in poultry house equipment. It is well known that cleanliness and the best possible sanitary conditions are necessary to success in the poultry industry; and the poultry raiser, if he would have vigorous and healthy stock, must keep his poultry house clean, and free from accumulation of dirt or refuse. In the modern-day form of construction of poultry houses a removable plane, designated as a "dropping board" is supported at proper height and mounted thereon or supported above same are perches upon which the fowls may roost. In the cleaning of the poultry house this board may be removed and after the droppings have been disposed of, the board is replaced at position. The taking down and cleaning and replacing of such dropping board is a disagreeable, laborious, and time-consuming task, the work must be done regularly and thoroughly however, if the ravages of infection and disease are to be prevented.

The main thing in aiding to the maintenance of clean and sanitary conditions is to subject to the light, and to fresh pure air, and to the sun's rays, every part of the poultry room possible where mites or vermin are liable to exist. The dropping board is the one part more than all others which must be kept free from accumulations for it is in and about the deposits or droppings that the mite, that most destructive of all vermin, to poultry, finds its breeding place.

The objects of my invention are to afford such improvement in poultry house construction and equipment that the keeping clean thereof is facilitated and the sanitary condition is improved.

More specifically, this invention has for its purposes to provide improved equipment, including a dropping board and support members so combined and arranged that the dropping board may be easily shifted or transported to outside location where the deposits may be readily and thoroughly removed, and where the said board may be subjected to the sun's rays and the fresh air.

The above purposes are accomplished by the new construction, combination and arrangement of parts described in this specification, defined in the appended claim, and illustrated in the accompanying drawings wherein similar characters of reference are used to designate corresponding parts in the several views, wherein—

Figure 1 is a view of a poultry house or room equipped with my invention. Fig. 2 is a vertical transverse sectional view taken on the line 2—2 in Fig. 1. Fig. 3 is an enlarged sectional view of a portion of the dropping board, taken on the line 3—3 in Fig. 2. Fig. 4 is an enlarged sectional view of a portion of the dropping board, taken on the line 4—4 in Fig. 2. Fig. 5 is an enlarged plan view showing the form of the inner ends of the stubs. Fig. 6 is an enlarged side view of the support member removed. Fig. 7 is a modification.

At the opposite walls A and $A^1$ of the poultry house or room are fastened the similar support members B and $B^1$ of the general form and structure as shown in detail in Fig. 6. The body-portion of this support member has the longitudinal slot C bounded by the horizontal flanges $C^1$, and at holes provided in the ears $B^2$, screws or bolts may be used to fasten the support members at the desired height on the walls A and $A^1$.

D designates the dropping board which may have the perches E carried thereon in the usual manner. Secured on the ends of the dropping board are stubs F and $F^1$, and G and $G^1$; the stubs F and $F^1$ engaging the slots C of the support members B and $B^1$, and the stubs G and $G^1$ resting on the flanges $C^1$. In Figs. 3, 4, and 5 these stubs are shown in detail. These stubs are made of wrought or malleable iron and have the shanks of flat form so that they may be held securely at position.

At the ends of the dropping board are extension plates $D^1$ made of thin sheet metal and which project over the supports and to the walls, thereby constituting a closure of the space between the walls and the ends of the dropping board and a shield or cover for the support members. In the rear wall $A^3$ is an opening equal in length to the distance between the side walls, and closed by a door H hinged at its top as shown in Figs. 1 and 2.

The preferred form of application of my invention is that shown in the drawings wherein the support members are disposed at horizontal position and the stubs F and $F^1$ and stubs G and $G^1$ are used, it being more natural for the user to fasten the supports up in horizontal alinement, than at an angle. The invention may be used however, in the manner as shown at Fig. 7, the advantage in this being that the one style or form of stub, namely G and $G^1$ is used; in this last named arrangement the support members are set at an incline.

By this invention the work of cleaning the dropping board, and of ventilating and cleaning the poultry house is much simplified and facilitated. The door H is opened and retained at opened position. The operator takes hold of the dropping board at the handles $D^2$ on the underside thereof and pulls the board toward him, the stubs F and $F^1$ moving in the slots C and the stubs G and $G^1$ moving on the flanges $C^1$. When the stubs F and $F^1$ come to the ends of the slots C, the board is let down to the dotted line position outside of the wall $A^3$ as shown in Fig. 2. In this position it is in the fresh air and sunlight, it may there be easily cleaned and thoroughly dried, and the dirt and refuse therefrom is completely outside of and removed from the poultry room. Free and wholesome circulation of fresh air, and entry of light in the room is possible, and the dropping board being entirely outside, the interior surfaces of and wall area of the room may be more easily cleansed and treated.

During the winter season or in inclement weather when the taking of the dropping board outside of the poultry house might be not convenient or desirable, the second method of practising the invention is used. The operator, standing in front of the dropping board pushes it rearwardly. When the stubs G and $G^1$ pass beyond the ends of the flanges $C^1$ the board swings downwardly to the second dotted line position shown in Fig. 2. In this position it may be more easily cleaned than when in the horizontal position, and the refuse will be delivered to the floor and without being scattered about or near the portion of the floor occupied by the operator.

By the use of this invention the poultry raiser will find it entirely possible to maintain his poultry room free from lice and the destructive mite and other vermin. The droppings being delivered from the board at a place certain, and without scattering, the gathering of same for carrying away for fertilizing markets or purposes is greatly facilitated. On account of the simple and inexpensive construction, and the ease with which this invention may be installed, it is available and its features of utility appeal to the small as well as the more pretentious poultryman.

What I claim as my invention, and desire to secure by Letters Patent, is—

In a poultry house, the combination of a wall thereof, supporting members spaced apart and disposed at a right angle to the wall, slotted bars secured to the supporting members and so positioned that there is a space between their ends and the inner face of the wall, a dropping-board, a pair of stubs for the front side of the board one being secured at each end thereof, a pair of stubs for the rear side of the board one being secured at each end thereof, the front pair of stubs being disposed in the slots of said slotted bars, and the rear pair of stubs being disposed on the tops of said slotted members, and there being a door-opening in the wall adjacent the dropping-board and adapted to permit the dropping-board to be passed therethrough, and a door for said opening.

In testimony whereof I affix my signature in presence of two witnesses.

ARTHUR F. BLECHSCHMIDT.

Witnesses:
CLAUDE L. MATHEWSON,
MAY GOODMAN.